(12) United States Patent
Munro et al.

(10) Patent No.: US 12,467,734 B2
(45) Date of Patent: Nov. 11, 2025

(54) REFLECTIVE INTERFEROMETER SYSTEMS AND METHODS THEREOF

(71) Applicant: OPTIPRO SYSTEMS, LLC, Ontario, NY (US)

(72) Inventors: James F. Munro, Ontario, NY (US); Robert D. Niederriter, Albany, CA (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 148 days.

(21) Appl. No.: 18/410,934

(22) Filed: Jan. 11, 2024

(65) Prior Publication Data

US 2024/0230311 A1 Jul. 11, 2024

Related U.S. Application Data

(60) Provisional application No. 63/438,440, filed on Jan. 11, 2023.

(51) Int. Cl.
| | |
|---|---|
| *G01B 9/02015* | (2022.01) |
| *G01B 9/02* | (2022.01) |
| *G01B 9/02002* | (2022.01) |
| *G01B 9/02061* | (2022.01) |
| *G01B 11/02* | (2006.01) |

(52) U.S. Cl.
CPC ..... *G01B 9/02015* (2013.01); *G01B 9/02002* (2013.01); *G01B 9/02034* (2013.01); *G01B 9/02061* (2013.01); *G01B 11/02* (2013.01)

(58) Field of Classification Search
CPC ............ G01B 9/02015; G01B 9/02002; G01B 9/02034; G01B 11/02; G01B 9/02061
See application file for complete search history.

(56) References Cited

U.S. PATENT DOCUMENTS

2019/0154594 A1* 5/2019 Barak ................... G01J 3/4535

FOREIGN PATENT DOCUMENTS

| JP | S63222207 | A | * | 9/1988 | ............. G01B 11/06 |
| JP | H01134285 | A | * | 5/1989 | ............. G01S 17/36 |
| JP | 2001280931 | A | * | 10/2001 | ............. G01B 11/24 |
| JP | 2009074812 | A | * | 4/2009 | ............. G01N 21/62 |
| JP | 2011069719 | A | * | 4/2011 | ............. G01N 21/27 |

* cited by examiner

*Primary Examiner* — Tarifur R Chowdhury
*Assistant Examiner* — Kaitlyn E Kidwell
(74) *Attorney, Agent, or Firm* — Troutman Pepper Locke LLP

(57) ABSTRACT

An interferometer system for measuring the displacement of a location of a test surface includes a reflective beamsplitter having a through-hole through which light enters into and exits from a reference arm and having a second through-hole through which a portion of light from the measurement arm of the interferometer passes through the beamsplitter and is incident on a position sensing device (PSD). The output of the PSD is then used as an indicator of the amount and direction of tilt of the surface under test so that systemic errors of the interferometer induced by the tilt of the test surface can be determined and removed from the displacement measurement.

30 Claims, 8 Drawing Sheets

REFLECTIVE INTERFEROMETER SYSTEMS AND METHODS THEREOF

This application claims the benefit of U.S. Provisional Patent Application No. 63/438,440 filed Jan. 11, 2023, the entirety of which is incorporated herein by reference.

FIELD

This technology generally relates to systems and methods for interferometrically measuring the displacement of a surface with high accuracy even when the surface is sloped or tilted.

BACKGROUND

Areal surface interferometry, including areal phase-measuring interferometry, has been used to measure the shape or form of optical surfaces for several decades. While generally quite fast and accurate, prior areal surface interferometry suffers from errors—such as retrace errors—and also introduces unexpected costs and complexities in the surface metrology process.

For example, areal interferometers often depend on test spheres and null correctors, and an error in their fabrication can result in later errors in the surface topography measurement results. In this example, the infamous surface errors in the primary mirror of the Hubble Space Telescope have been traced to problems with a null corrector. Since that time NASA—and associated manufacturers of large optics—have been seeking non-areal yet non-contact approaches for high-precision surface metrology. Generally, these approaches have entailed the use of an optical probe system that measures displacement of a surface at a given location, and the probe is then scanned across the surface of interest to generate a complete surface profile.

One such prior art displacement measuring device is the spectral interferometric probe 10 shown in FIG. 1. The spectral interferometric probe 10 has a broadband light source 12 that emits light that is subsequently collimated by collimating lens 14 which then enters a beamsplitter 16. The beamsplitter 16 reflects a portion of the collimated light beam causing a portion of said collimated light beam to enter a chromatic lens 28 that focuses the light in such a way that its focal position along an optical axis 18 varies with wavelength. This converging chromatic light then strikes a second beamsplitter 30 which further divides the beam into a reference beam, shown reflecting to the left in FIG. 1 towards a reference mirror 24, and a measurement beam shown propagating downward through the second beamsplitter 30 towards a test surface 32. Note that the chromatic lens 28, the second beamsplitter 30, and the reference mirror 24 are located within the measurement head 20, which in turn is coupled to a linear piezo-electric transducer (PZT) stage 22. The linear piezo-electric transducer stage 22 can cause the measurement head 20, and its internal constituents, to move along the optical axis 18 closer to or further away from the test surface 32. Light reflected from the reference mirror 24 and the test surface 32 (at measurement spot 26) both reflect back to the second beamsplitter 30 and then both re-enter the chromatic lens 28 which then re-collimates the two light beams.

The two re-collimated light beams then pass through the beamsplitter 16, enter the focusing lens 40, and then enter the spectrograph 42 through a small aperture at the focal point of the focusing lens 40. The two re-collimated beams then form a spectral interference pattern on the image sensor of the camera 44 associated with the spectrograph 42. The resulting spectral interference fringe pattern has several inflection points and high-slope regions for improved downstream processing and fitting by the digital processor 46.

Under these conditions, the displacement can be found quite accurately, to less than a nanometer, and is a particular strength of the spectral interferometric probe 10. A second strength is that if the measurement light reflected from the test surface 32 is weak (perhaps because the test surface 32 is highly polished and tilted) then the interferometric gain present in the interference pattern provides a means of intensifying the weak optical signal so that it is of sufficient brightness to be image-able by the spectrograph 42 and to be processed by the digital processor 46.

Unfortunately, a serious drawback of the spectral interferometric probe 10 is that the optical path lengths of the reference arm and the measurement arm in this example are substantially equal in order to obtain interference fringes at the image sensor of the camera 44. Since the optical path length, or equivalently the displacement, associated with the test surface 32 is unknown, then the position of the reference mirror 24 in this example is scanned, or equivalently, the reference arm is not scanned and instead the whole measurement head 20 is scanned by virtue of PZT 22 until a scanning position is found that produces the desired interference fringes. This scanning process requires a significant amount of time and limits the measurement throughput rate of spectral interferometer probe 10 to about 100 displacement measurement per second.

SUMMARY

An interferometer system includes a measurement arm, a reference arm comprising at least a concave mirror, an input/output arm comprising a fiber optic, a PSD arm comprising a position sensing device, a reflective beamsplitter, and an output system. The beamsplitter is configured to receive diverging light from the input/output arm and reflect a portion of that light into the measurement arm in a manner such that the reflected light is brought to a focus at the surface under test. The beamsplitter is also configured with an aperture through which another portion of the diverging source light is transmitted into the reference arm, and through which reflected converging reference light is again transmitted as it re-enters the input/output arm. Light focused on the surface under test is reflected back onto the reflective beamsplitter surface, a portion of which is reflected back into the input/output arm such that it is brought to a focus on the fiber optic. The beamsplitter is also configured with a second aperture through which another portion of the reflected diverging measurement light is transmitted such that the transmitted light becomes incident on a position sensing device (PSD). Reflected measurement light incident on the PSD can be used to sense the slope of the test surface such that slope-induced measurement errors can be subsequently subtracted from a measurement made by the interferometer system. Reference and measurement light that is incident on the fiber optic of the input/output arm are transmitted by the fiber optic to a spectrograph whose output spectral interferogram is captured and digitized by a camera and subsequently processed by a digital processing system which is configured to determine at least one measured property of the target from the detected measurement light and the detected reference light.

Accordingly, examples of the claimed technology provide a number of advantages including measurement operations that do not require the mechanical movement of a reference mirror or an interferometer head to perform a displacement measurement such that the measurement system has a fast displacement measurement rate, as well as the high accuracy of an interferometric probe even when the surface being measured is sloped or tilted.

DETAILED DESCRIPTION

Figure 1:
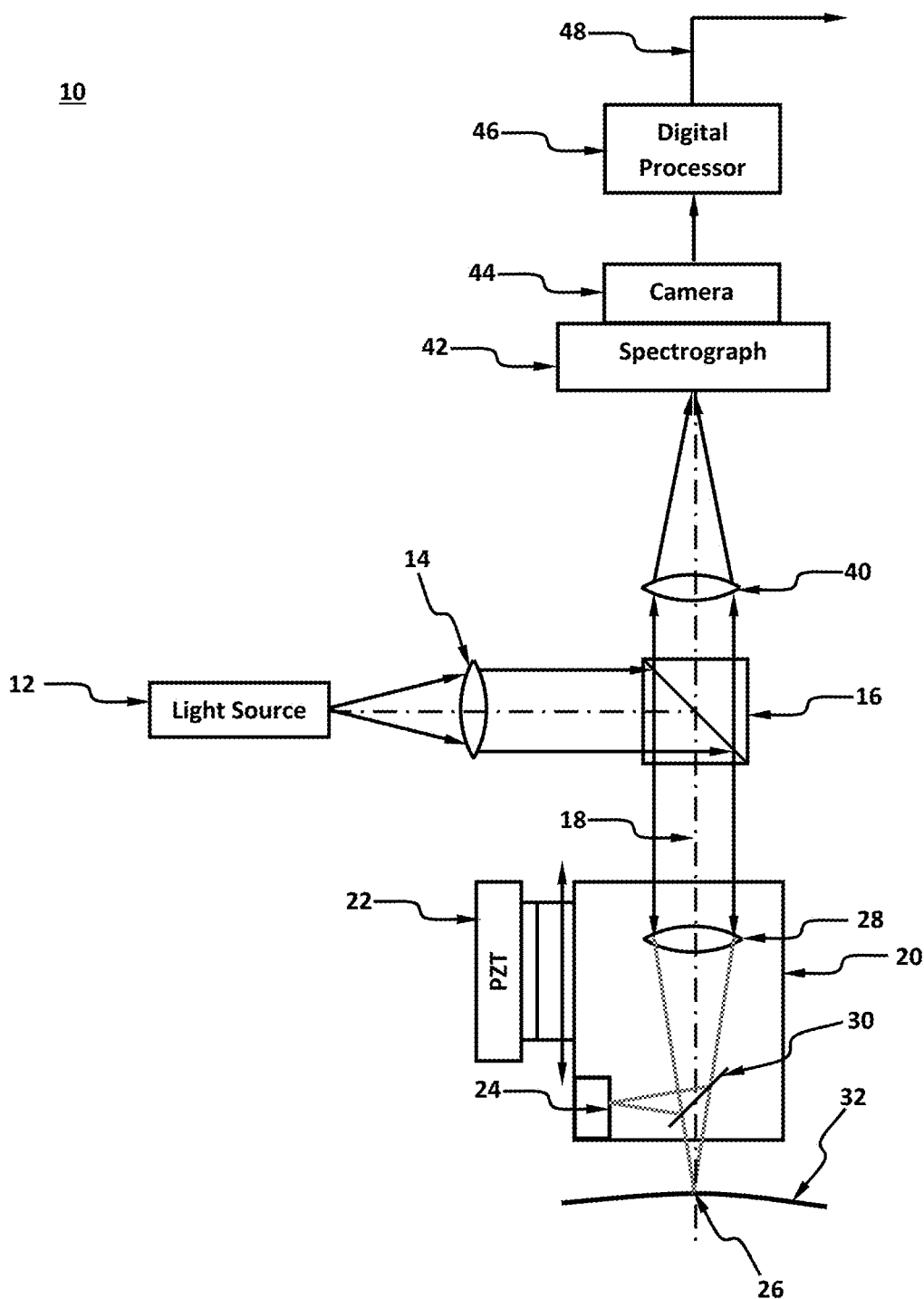
FIG. 1 is a block diagram of a prior art confocal interferometric displacement measuring system.
Figure 2:
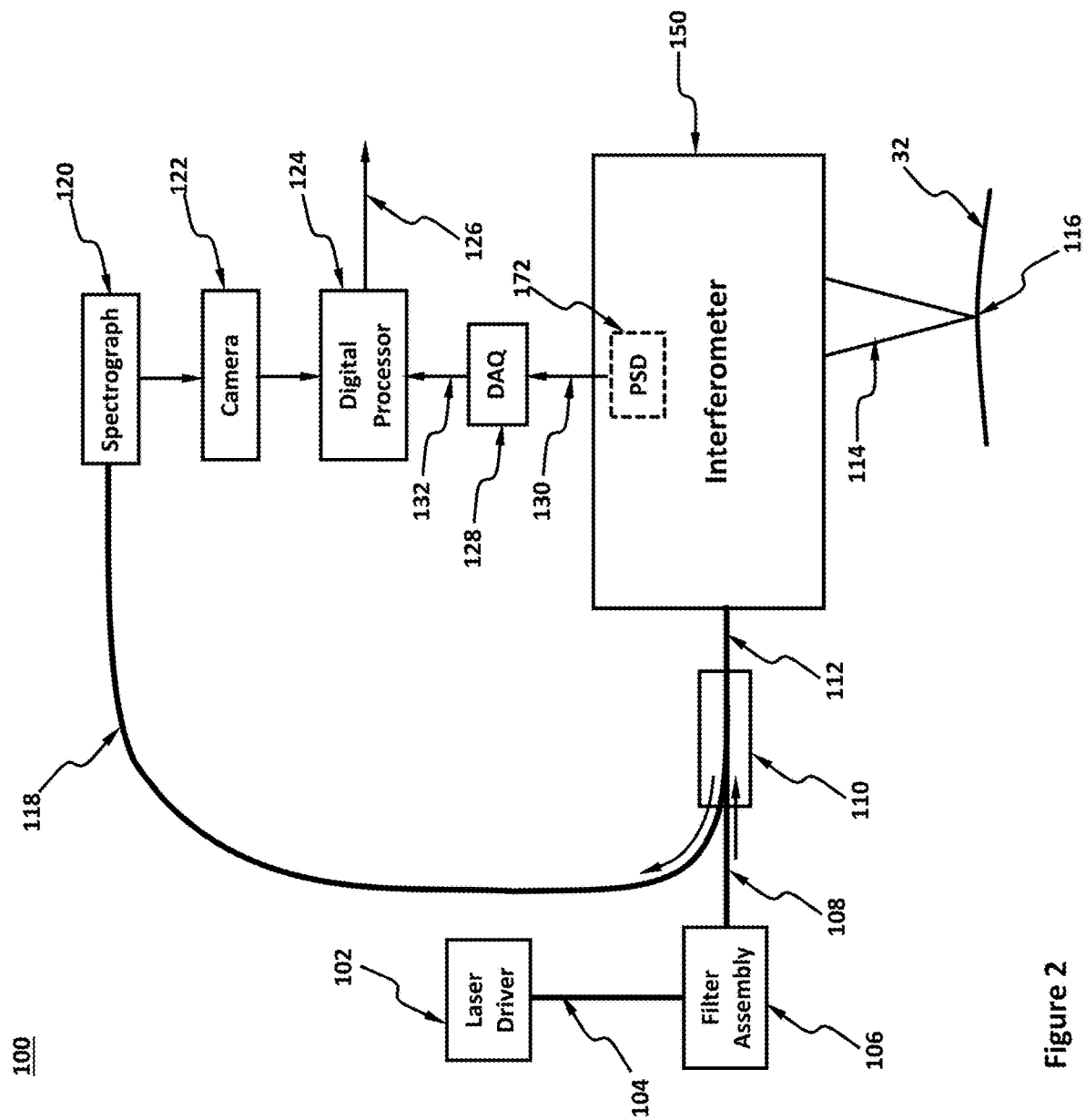
FIG. 2 is a block diagram of an example of an interferometer system in accordance with embodiments of the present invention.
Figure 3:
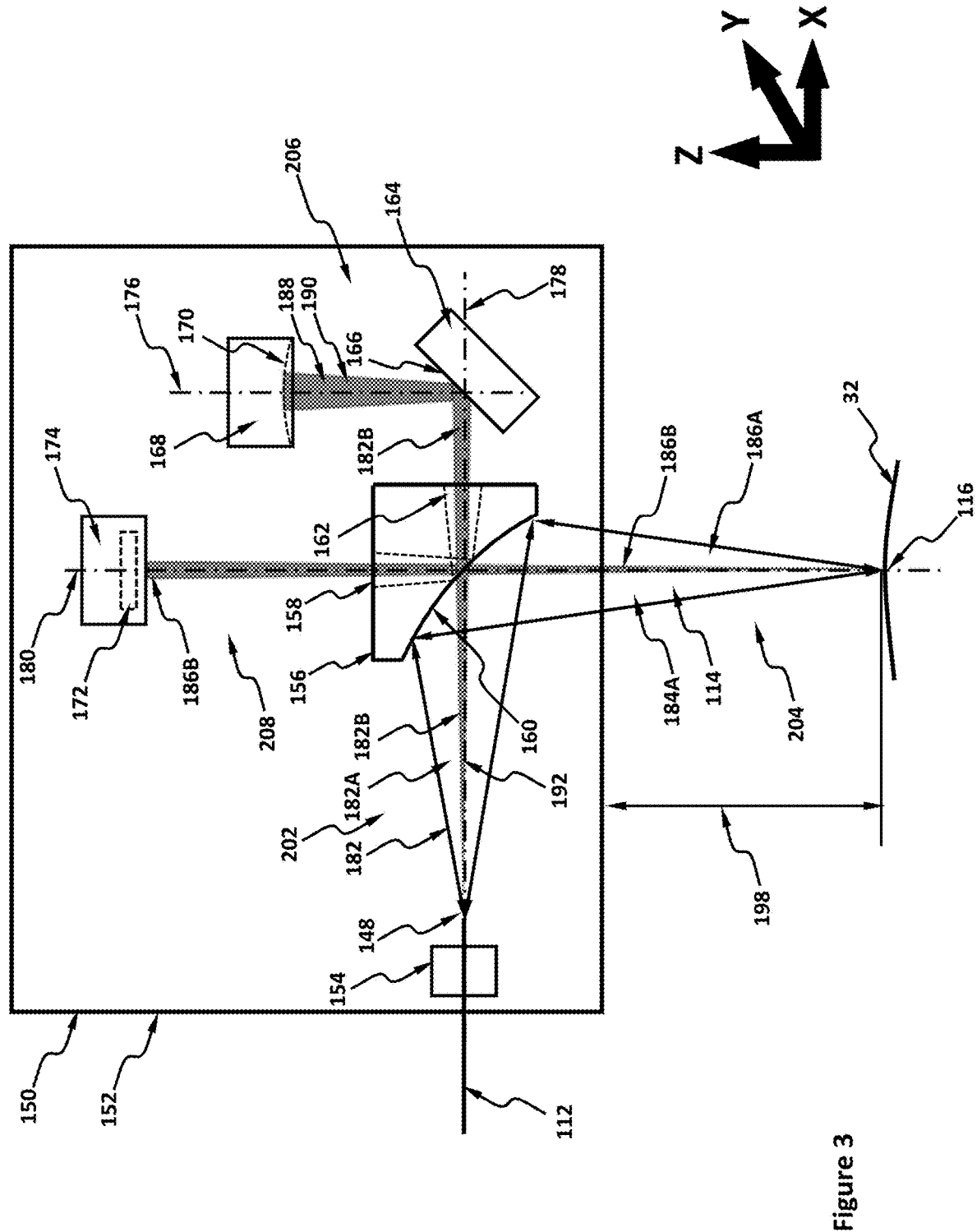
FIG. 3 is a plan-view diagram of an example of an interferometer in the interferometer system shown in FIG. 2.

An interferometer system 100 in accordance with examples of the claimed technology is illustrated in FIGS. 2 and 3. In this example, the interferometer system 100 comprises a laser driver 102, a broad-band fiber laser 104, a filter assembly 106, a source fiber optic 108, a fiber coupler 110, an input/output fiber 112, an interferometer 150, an output fiber 118, a spectrograph 120, a camera 122, a data acquisition system 128, a digital processing system 124 and an interferometer system output 126, although the interferometer system 100 may have other types and/or numbers of other components and/or other elements in other configurations. Interferometer 150 comprises a base 152, fiber mount 154, beamsplitter 156, fold mirror 164, reference mirror 168, and position-sensing device 172, although interferometer 150 may have other types and/or numbers of other components and/or other elements in other configurations. The claimed technology provides a number of advantages including providing a displacement measurement system that has a fast displacement measurement rate and high accuracy even when the surface being measured is sloped or tilted.

Referring more specifically to FIG. 2, the laser driver 102 has an output coupled to a fiber laser 104 whose light output is coupled to an input of filter assembly 106, although other components and/or elements in other configurations may be used. The laser driver 102 and the fiber laser 104 together comprise a broadband light source, whose output is through a small-diameter aperture at the end of fiber laser 104, although other types of light sources may be used. In one example, the laser driver 102 and the fiber laser 104 are a so-called white-light laser, more technically known as a supercontinuum laser, although other types of white light or other broadband light sources, such as those that utilize LEDs, SLEDs (super-luminescent LEDs) or incandescence by way of example, can be used.

In this example, the requirements and characteristics of the light source are: (1) that the output light pass through a small-diameter aperture such as a 5 µm diameter associated with a single-mode fiber; (2) that as much optical flux passes through the output aperture as possible; (3) that the coherence length of the light is greater than or equal to 1 mm, and (4) that the output photon flux is broad-band, although other types and/or numbers of requirements and/or characteristics of the light source may be used in other examples. For example, typically the fiber laser 104 is a single-mode fiber and has a core diameter—and exit aperture diameter—of less than 10 µm, and in some examples preferably less than or equal to 5 µm. The optical flux exiting the fiber laser 104 in this example should be as great as possible, being at least 100 µW/nm, or in some examples advantageously at least 200 µW/nm, or in other examples advantageously greater than 1 mW/nm. Finally, in this example the spectrum of the light exiting the light source is broadband, and also of a wavelength range that the downstream image sensor of the camera 122 is responsive to. In particular, in this example light in the range of 450 nm to 650 nm is advantageous, while light from 400 nm to 800 nm is even more advantageous, although in other examples other ranges may be preferred such as from 700 nm to 2400 nm.

One of ordinary skill in the art will appreciate that the laws of etendue generally restrict the ability of a light source to output relatively large spectral flux values. However, in this example a laser driver 102 and a fiber laser 104 comprising a supercontinuum laser can economically meet the desired flux emission values with a small (e.g., 5 µm diameter) aperture as well as the desired wavelength range. Because a supercontinuum laser often produces significant amounts of light above 800 nm, and because these wavelengths of light are generally not needed or used by examples of the claimed technology, but instead, if not removed, can propagate into the interferometer 150 and be absorbed by components or surfaces inside the interferometer 150 thereby generating heat and internal thermal gradients. Since these internal thermal gradients can cause poor displacement measuring performance, it is desirable to filter these longer wavelengths or otherwise prevent them from entering the interferometer 150.

The filter assembly 106 has an input coupled to an output of the fiber laser 104 and an output coupled to a source fiber 108, although other components and/or elements in other configurations may be used. The filter assembly 106 has provisions for filtering the unwanted wavelengths from the light output from fiber laser 104, although other types of filters may be used. In other examples, the filter assembly 106 may also have provisions for filtering unwanted polarizations from the light output from the fiber laser 104 and for ensuring that the polarization passing through the filter assembly 106 and into the source fiber 108 is of a known polarization state and orientation, although the filter assembly may have other types and/or numbers of provisions.

The source fiber 108 is used to couple the filtered light output by the filter assembly 106 to an input of fiber coupler 110. The source fiber 108 is in some examples preferably a single-mode fiber, having a core diameter less than 10 µm, or in some examples preferably less than 5 µm, and transmits all wavelengths of light that are used by interferometer 150, such as 400 nm to 800 nm, to the interferometer with minimal attenuation. Additionally, since the light output by the filter assembly 106 can be polarized, the source fiber 108 can have polarization-preserving or polarization-maintaining properties. Further, since the laser driver 102 and the fiber laser 104 generate heat, in this example the laser driver 102 and the fiber laser 104 are placed a sufficient distance from interferometer 150 so the performance of interferometer 150 is not affected by these heat generating sources. In this example the length of the source fiber 108 is at least one meter to provide the sufficient distance, or in other examples at least two meters, provided the length does not significantly attenuate any of the wavelengths transmitted by the source fiber 108.

Fiber coupler 110 is a three-port device that is used to either combine or to split optical signals being transmitted through fiber-optics. In the example embodiment shown in FIG. 2, fiber coupler 110 has an input coupled to an output of source fiber optic 108, an output coupled to an input of output fiber 118, and a two-way bidirectional (i.e., input and output) port coupled to input/output fiber 112. Fiber coupler 110 can be a single-mode fiber-optic device and must transmit at least a portion of all wavelengths of light (through all three ports) that are used by interferometer 150 for the displacement-measuring process. A typical device that can be employed for use as fiber coupler 110 is the Thorlabs (Newton, NY, USA) TW560R3A1 which is a wide-band, 2×1, single-mode, 50:50 coupler having a 250 nm optical bandwidth centered on 560 nm. Light entering coupler 110 from source fiber 108 is transmitted by coupler 110 into input/output fiber 112, and light entering coupler 110 from input/output fiber 112 is transmitted by coupler 110 into output fiber 118.

The input/output fiber 112 is used to couple the light output by the coupler 110 to an input of interferometer 150 as well as to couple light output by interferometer 150 to coupler 110. The input/output fiber 112 is in some examples preferably a single-mode fiber, having a core diameter less than 10 µm, or in some examples preferably less than 5 µm, and transmits all wavelengths of light that are used by interferometer 150, such as 400 nm to 800 nm, to (and from) the interferometer 150 with minimal attenuation. Additionally, since the light output by the filter assembly 106 can be polarized, the input/output fiber 112 can have polarization-preserving or polarization-maintaining properties. Further, since the laser driver 102 and the fiber laser 104 generate heat, in this example the laser driver 102 and the fiber laser 104 are placed a sufficient distance from interferometer 150 so the performance of interferometer 150 is not affected by these heat generating sources. In this example the length of the input/output fiber 108 is at least one meter to provide the sufficient distance, or in other examples at least two meters, provided the length does not significantly attenuate any of the wavelengths transmitted by the input/output fiber 112.

The interferometer 150 is a device for creating interfering beams of light. In this example, the interferometer 150 outputs broadband measurement light 114 that is used as part of an interferometric process for determining a displacement of a test surface 32 at a measurement spot 116.

Referring to FIG. 3, a more detailed view of an example of the interferometer 150 of the interferometer system 100 from FIG. 2 is illustrated. The interferometer 150 can comprise a base 152 on which is installed a fiber mount 154, a beamsplitter 156, a fold mirror 164, a reference mirror 168, and a position sensing device (PSD) 172, although interferometer 150 may have other types and/or numbers of other components and/or other elements in other configurations. Interferometer 150 can comprise four arms, such as source arm 202 (which can also be an output arm) which includes the optics of interferometer 150 to the left of beamsplitter 156 in FIG. 3; a PSD arm 208 which includes the optics of interferometer 150 above beamsplitter 156 in FIG. 3; a reference arm 206 which includes the optics of interferometer 150 to the right of beamsplitter 156 in FIG. 3; and a measurement arm 204 which includes the optics of interferometer 150 below beamsplitter 156 in FIG. 3. The components comprising interferometer 150 can be oriented on or with respect to a source/reference arm axis 178, a measurement arm axis 180, and a reference axis 176, although interferometer 150 may have other types and/or numbers of other axes and/or other axes in other configurations.

Figure 4:
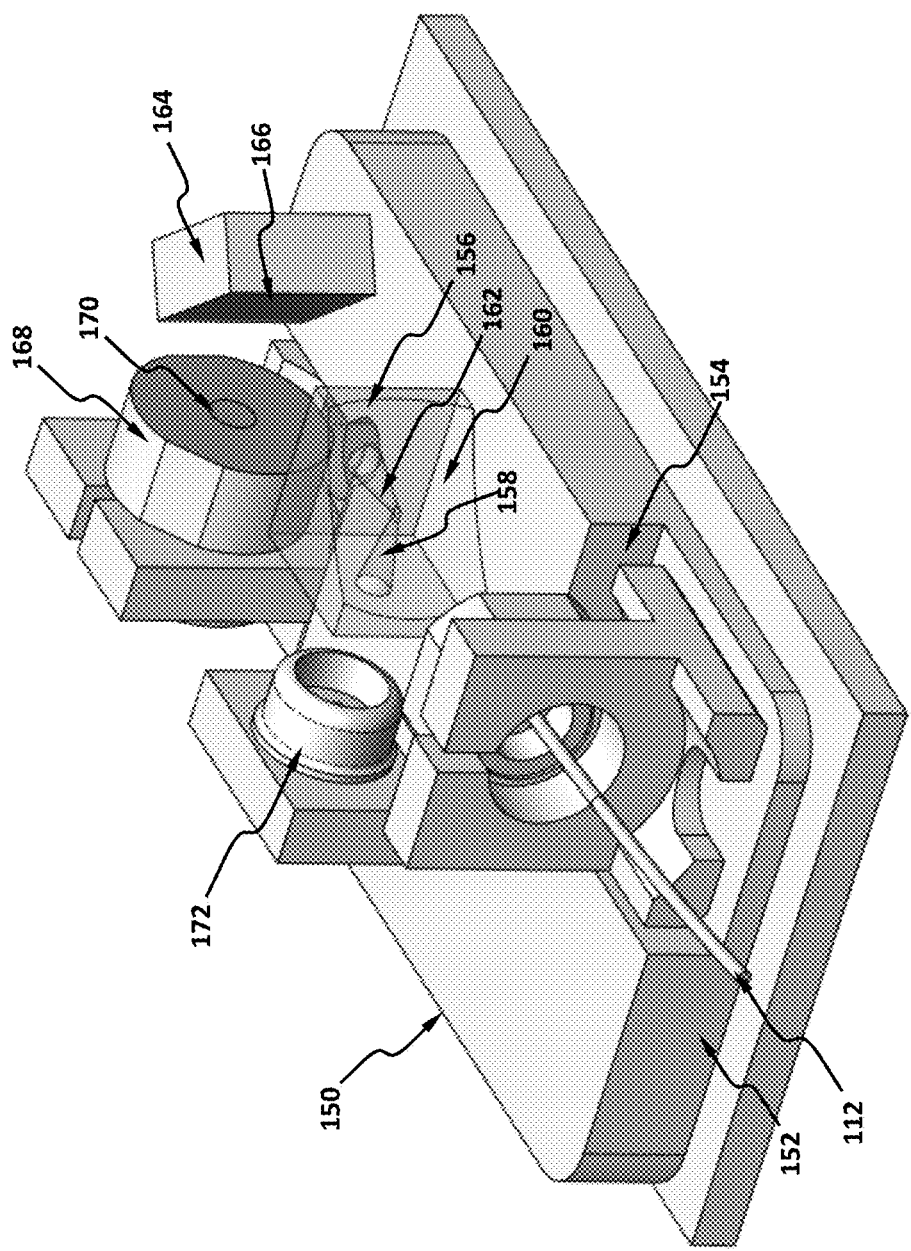
FIG. 4 is an isometric view of a diagram of the example of the interferometer shown in FIG. 3.
Figure 5:
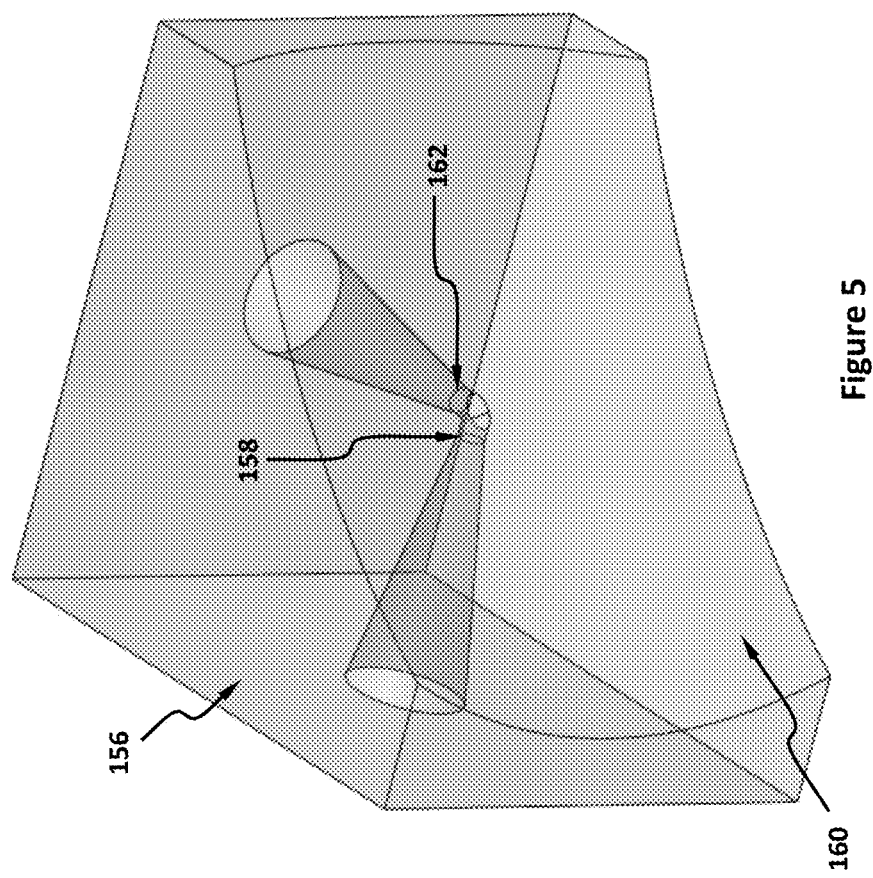
FIG. 5 is an oblique view of a beamsplitter used in an example of the interferometer shown in FIG. 4.

Base 152 is the platform or "optical bench" on which the components comprising interferometer 150 are installed. Base 152 can be rectangular cuboid in shape, and is in this example preferably composed of a material that has a low coefficient of thermal expansion (CTE), such as Zerodur®, ULE®, or Invar. That is, because interferometer 150 is sensitive to changes in optical path length in the measurement arm 204 and the reference arm 206 on the order of picometers, the base 152 on which the components of the interferometer 150, namely beamsplitter 156, fold mirror 164, and reference mirror 168, are mounted should not expand or contract appreciably when small changes in ambient temperature occur. The CTE of the material of base 152 should be less than 10 parts per billion (PPB) per degree C., or in this example preferably less than 5 PPB, or in other examples more preferably the CTE of the material of base 152 is less than 2 PPB. As an example, if the reference arm temperature changes by 0.1 degrees C., the optical path length of the reference arm is 100 mm, and the CTE of the material of base 152 is 10 parts per billion (PPB) per degree C., then the optical path length of the reference arm will change by $10^{-10}$ meters or 100 picometers—an amount much greater than the accuracy of the present invention. Base 152 can also have features machined into one or more of its surfaces to facilitate locating, placement, or mounting of the components (as illustrated in FIG. 4), such as fiber mount 154, beamsplitter 156, fold mirror 164, reference mirror 168, and PSD 172, or for adjusting or aligning these components while interferometer 150 is being assembled. Base 152 can also have features or provisions to facilitate the mounting or attachment of interferometer into a metrology or positioning system such as a CMM (coordinate measurement machine). The thickness (in the Y-direction of FIG. 3) of base 152 can be between 2 mm and 100 mm; the width (in the X-direction of FIG. 3) can be between 50 mm and 1000 mm; and the height (in the Z-direction of FIG. 3) can be between 25 mm and 500 mm.

Fiber mount 154 is used to securely position input/output fiber 112 with respect to the other optical components of interferometer 150. Fiber mount 154 can be a block of low-CTE material with a thru-hole in which input/output fiber 112 is securely installed. Preferably in this example fiber mount 154 is made from the same material as base 152 so the mechanical properties (such as the CTE) of the two components are substantially identical so stresses or movements are not induced in either of the components with small changes in temperature. As such, fiber mount 154 can be in this example preferably composed of ULE®, Zerodur®, or invar materials. Fiber mount 154 can also have features machined into one or more of its surfaces to facilitate locating, placement, or mounting of the fiber mount 154 on base 152. Fiber mount 154 can also have features machined into one or more of its surfaces to facilitate locating, adjusting, aligning, or mounting of the input/output fiber 112 within fiber mount 154 and/or other optical component of interferometer 150 Fiber mount 154 can also have features machined into one or more of its surfaces to facilitate locating, placement, or mounting of the fiber mount 154 on base 152. Fiber mount 154 can also have features machined into one or more of its surfaces to facilitate locating, adjusting, aligning, or mounting of the input/output fiber 112 within fiber mount 154 and/or other optical component of interferometer 150.

Beamsplitter 156 is used to split the diverging beam of light emitted by input/output fiber 112 within light cone 182 into an angularly-narrow reference beam of light 182B and a relatively angularly-broad measurement beam of light 182A. Importantly, the light beams do not pass through a solid optically-transmissive medium such as glass, but instead the beamsplitting occurs reflectively with reflective surface 160 acting cooperatively with reference aperture 162. Reflective surface 160 can have a spherical prescription, a parabolic prescription, a free-form prescription, but in this example most preferably an elliptical prescription such that the portion of light emitted from input/output fiber 112 and is incident on reflective surface 160 reflects in a manner that the reflected light is brought to a focus at measurement spot 116 (this focusing is described below in connection with FIG. 6). Beamsplitter 156 can also have a second aperture, such as PSD aperture 158, through which a portion of the light reflected from test surface 32 is allowed to reach the PSD to facilitate calibration corrections as described below. The surface figure error (e.g., the departure of the surface from a perfect ellipse) of reflective surface 160 should be minimal as these errors must be removed during calibration correction. The surface figure error of reflective surface 160 can be less than 1 micron, peak-to-valley, or in this example preferably less than 100 nanometers peak-to-valley, or in other examples more preferably less than 10 nanometers peak-to-valley over the clear aperture of reflective surface 160. Alternately the surface figure error of reflective surface 160 can be less than 100 nanometers RMS (root-mean-square), or in this example preferably less than 10 nanometers RMS, or in other examples more preferably less than 1 nanometer RMS over the clear aperture of reflective surface 160.

Beamsplitter 156 is in this example preferably made from the same material as base 152 so the mechanical properties (such as the CTE) of the two components are substantially identical so stresses or movements are not induced in either of the components with small changes in temperature. As such, beamsplitter 160 can be in this example preferably composed of ULE®, Zerodur®, or invar materials. Beamsplitter 156 can also have features machined into one or more of its surfaces to facilitate locating, adjusting, aligning, or mounting of the beamsplitter 156 on base 152 and/or with respect to other optical component of interferometer 150. Reflective surface 160 is reflective to a broad band of wavelengths such that it reflects light having a wavelength greater than 600 nm, or in this example preferably greater than 500 nm, or in other examples more preferably greater than 400 nm. Additionally, the reflective coating of reflective surface 160 can reflect wavelengths less than 500 nm, or in this example preferably less than 600 nm, or in this example more preferably less than 700 nm or even 850 nm. The reflective coating of reflective surface 160 can comprise a metal such as aluminum, silver, gold, or even silicon, and can have a thin transparent protective coating, such as silicon dioxide, installed atop the reflective coating.

Fold mirror 164 and reference mirror 168 together define the reference arm of interferometer 150, although fold mirror 164 is optional in which case reference mirror 168 is positioned on source/reference axis 178 instead of on reference axis 176. Fold mirror 164 has a reflective surface 166 that acts to reflect light passing through reference aperture 162 to the reference mirror 168 and then reflect light from reference mirror 168 into reference aperture 162. Reflective surface 166 can have optical power but is instead in this example preferably substantially planar. The reflective coating of reflective surface 166 can comprise a metal such as aluminum, silver, gold, or even silicon, and can have a thin transparent protective coating, such as silicon dioxide, installed atop the reflective coating. The reflective coating of reflective surface 166 in this example preferably has substantially the same spectral reflective properties as the reflective coating of reflective surface 160 of beamsplitter 156. Fold mirror 164 is in this example preferably made of the same material as base 152 so the mechanical properties (such as the CTE) of the two components are substantially identical so stresses or movements are not induced in either of the components with small changes in temperature. As such, fold mirror 164 can be in this example preferably composed of ULE®, Zerodur®, or invar materials. Fold mirror 164 can also have features machined into one or more of its surfaces to facilitate locating, adjusting, aligning, or mounting of the beamsplitter on base 152 and/or with respect to other optical component of interferometer 150.

Reference mirror 168 is the main component of the reference arm of interferometer 150. A portion of the light exiting input/output fiber 112 passes through reference aperture 162 of beamsplitter 156, reflects from reflective surface 166 of fold mirror 164, which is reference light 188, and is incident on reference mirror surface 170 of reference mirror 168. Reference light 188 incident on reference mirror surface 170 of reference mirror 168 is then reflected, forming reflected reference light 190, which is then incident on, and reflected from, reflective surface 166 of fold mirror 164 which thereupon passes through reference aperture 162 of beamsplitter 156 and is substantially brought to a focus on the aperture 148 of input/output fiber 112. As such reflective surface 170 of reference mirror 168 has optical power such that the diverging reference light 188 incident upon reflective surface 170 is reflected in a manner such that reflected reference light 190 is converging as it propagates back towards fold mirror 164 and input/output fiber 112. Reflective surface 170 can have a prescription that is substantially spherical with a radius of curvature that is substantially the same as the optical path length from input/output fiber 112 to reflective surface 170 along source/reference axis 178 and reference arm axis 176. The surface figure error of reflective surface 170 should be significantly less than the wavelength of light to ensure good contrast of the resulting spectral interference fringes in spectrograph 120; the figure error of reflective surface 170 can be less than 0.5 microns RMS, or in this example preferably less than 100 nanometers RMS, or ideally less than 10 nanometers RMS over the clear aperture of reflective surface 170. The reflective coating of reference mirror surface 170 can comprise a metal such as aluminum, silver, gold, or even silicon, and can have a thin transparent protective coating, such as silicon dioxide, installed atop the reflective coating. In this example, the reflective coating of reference mirror surface 170 in this example preferably has substantially the same spectral reflective properties as the reflective coating of reflective surface 160 of beamsplitter 156. In this example the reference mirror 168 is in this example preferably made of the same material as base 152 so the mechanical properties (such as the CTE) of the two components are substantially identical so stresses or movements are not induced in either of the components with small changes in temperature. As such, in this example the reference mirror 168 can be in this example preferably composed of ULE®, Zerodur®, or invar materials. Reference mirror 168 can also have features machined into one or more of its surfaces to facilitate locating, adjusting, aligning, or mounting of the reference mirror 168 on base 152 and/or with respect to other optical component of interferometer 150.

Importantly, input/output fiber mount 154, beamsplitter 156, fold mirror 164, reference mirror 168, and even PSD mount 174 are in this example preferably fabricated from a material having a low CTE (coefficient of thermal expansion) such as invar (a metal) or a glass such as ULE® or Zerodur®. Further, these components should all be fabricated from the same material (i.e., not some made from invar and others from ULE®) so their CTE's are substantially identical which will preclude the presence of temperature-induced stresses and strains which can cause nanometer-scale movements, or even sub-nanometer scale movements, of the optical components comprising interferometer 150 which can cause measurement inaccuracies at this scale. Additionally, the method by which the input/output fiber mount 154, beamsplitter 156, fold mirror 164, reference mirror 168, and even PSD mount 174 are bonded or attached to base 152 should also not cause temperature-induced stresses and strains which can cause nanometer-scale movements, or even sub-nanometer scale movements, of the components. For example, if the optical components are all fabricated from ULE®, then an organic UV glue or metallic screws should not be employed to fasten the components together. A more preferable way to join the optical components of interferometer 150 together is to fabricate base 152, input/output fiber mount 154, beamsplitter 156, fold mirror 164, reference mirror 168, and even PSD mount 174 from ULE® (or Zerodur®) and then use a mixture of water, sodium hydroxide, and sodium silicate to bond the components together. With this process, known at times as hydroxide catalysis bonding, it is known that when the water evaporates, the sodium hydroxide and sodium silicate cause the glasseous optical components to chemically combine with one another such that they in effect become a unitary glass object. The resulting unitary glass object has substantially the same optical, thermal, and mechanical properties as the original glass of which the bonded components are composed.

Continuing with reference to FIG. 3, position sensing device (PSD) 172 is positioned on, and substantially orthogonal to, measurement arm axis 180, and receives a portion of the light reflected from the test surface 32, namely reflected PSD light 186B, that passes through PSD aperture 158 of beamsplitter 156. Since test surface 32 is generally not planar, either by design or by having surface errors that cause the test surface 32 to not be orthogonal to measurement arm axis 180 at measurement spot 116, then the light reflected from test surface 32, namely reflected measurement light 186A, will not be centered on measurement arm axis 180 but instead will be centered on an axis that is at an angle with the measurement arm axis 180 in which the angle is two times the slope angle of the test surface 32 at measurement spot 116. As such, reflected measurement light 186A will be incident on different areal locations of reflective surface 160 in accordance with the tilt or slope test surface 32, and because reflective surface 160 cannot be fabricated perfectly and some portions of reflective surface 160 will be higher or lower than ideal (i.e., protrude above or below the ideal surface), the optical path length of rays travelling from measurement spot 116 to the aperture 148 of input/output fiber 112 will vary in accordance with the surface error of reflective surface 160. That is, the optical path length of rays travelling from measurement spot 116 to the fiber will vary in accordance with the slope angle of test surface 32 due to the surface figure errors of reflective surface 160. The interferometer system 100 can have accuracies of a few tens of picometers if there were no systematic errors in the optics, such as less than 50 picometers, or even less than 20 picometers. However, this accuracy is compromised by the surface figure errors of reflective surface 160. Fortunately, if the slope angle of the test surface 32 is known, and if the systematic measurement errors (as a function of the slope angle of test surface 32) can be determined in a calibration process, then the slope-dependent errors can be removed during the measurement process. This calibration and correction process requires knowledge of the slope of the test surface 32, which is determined by the use of PSD 172.

The PSD 172 is a device that can be used to determine the location, and intensity, of a spot of light that is incident upon the active face of the PSD. One type of PSD is a quadrant detector such as the QP50-6-18U-TO8 from First Sensor (Montreal, Quebec, Canada) which is an array of four photodiodes arranged in a 2×2 array having an outer perimeter that is 14 mm in diameter. A beam of light, such as reflected PSD light 186B, that is incident in the middle of the quadrant detector will produce equal photocurrents in each of the four photodiodes; a change in the beam's location will produce accordingly different levels of photocurrent in the photodiodes thus providing a means of determining the location of the beam at the input plane of the PSD 172. Alternately PSD 172 can be a dual-lateral device such as the DLS-2 from OSI Optoelectronics, Inc. (Hawthorne, California, USA) which comprises a single square photodiode with a single lead or conductor placed along each of the four edges. The amount of photocurrent flowing through each of the four leads varies in accordance with the position and intensity of the light beam incident on the photodiode. Regardless of which type of PSD is utilized, PSD 172 can be used to determine the location (and intensity) of reflected PSD light 186B from which the slope angle of test surface 32 at measurement arm axis 180 can be deduced. The amount of slope angle of test surface 32 that can be measured by PSD 172 can be from −2.0° to +2.0° about the X-axis and from −2.0° to +2.0° about the Y-axis.

The output of PSD 172 is an electronic signal which is output to a data acquisition system (DAQ) 128 through PSD output line 130. DAQ 128 can consist of an analog to digital converter (A/D or ADC) that converts the electronic signal present on the PSD output line 130 to a digital format and outputs the digital data to the digital processor 124 through DAQ output 132. The DAQ's 128 A/D sub-system can have 16 bits of resolution, although 20 bits of resolution is preferred. Further, if PSD 172 is a quadrant detector, for example, having four individual output lines (e.g., 130A, 130B, 130C, and 130D, not shown in FIG. 2) then the DAQ 128 can have four individual A/D channels accordingly, or, in this example less in this example preferably, the four channels can be multiplexed through a single A/D device within DAQ 128.

Referring again to FIG. 2, in operation broadband light produced by fiber laser 104 enters filter assembly 106 whereupon filter assembly removes unused or otherwise undesirable wavelengths of light from the output of fiber laser 104. As an example, if fiber laser 104 produces light having wavelengths between 400 nm and 2400 nm, and only wavelengths from 400 nm to 700 nm are actually used by interferometer 150, then filter assembly 106 can remove wavelengths from 700 nm to 2400 nm so those wavelengths do not enter interferometer 150 and possibly cause heating and thermal gradients within interferometer 150 and degrade the performance of interferometer 150. Light that passes through filter assembly 106 then enters source fiber optic 108, passes through fiber coupler 110 and enters interferometer 150 through input/output fiber 112. Input/output fiber 112 is in this example a single-mode fiber, having a core diameter less than 10 µm, or in other examples having a diameter less than 5 µm, and substantially transmits all wavelengths of light that are used by interferometer 150, such as from 400 nm to 800 nm with minimal attenuation, although optical fibers with other characteristics may be used. Further, the laser driver 102, spectrograph 120 and accompanying camera 122 typically generate significant quantities of heat and should each be placed a sufficient distance from interferometer 150 so the performance of the interferometer 150 is not affected by these adjacent heat sources. In this example, the length of input/output fiber 112 to provide such a sufficient distance is at least one meter, or in some examples preferably at least two meters, provided the length does not significantly attenuate any of the wavelengths of light required for the operation of interferometer system 100.

Referring now to FIG. 3, light exiting input/output fiber 112 as it enters interferometer 150 diverges, due to diffraction, and forms light cone 182 which is substantially centered upon source/reference arm axis 178. The included angle of light cone 182 is determined by the emission angle of the light exiting single-mode input/output fiber 112 which can also be substantially the same as the acceptance angle of input/output fiber 112. Diverging light exiting input/output fiber 112 within light cone 182 propagates to beamsplitter 156, a portion of which (namely measurement light 182A) is incident on reflective surface 160 and another portion of which (namely reference light 182B) is incident on—and passes through—reference aperture 162. Measurement light 182A is reflected from reflective surface 160 of beamsplitter 156 into measurement light 184A which is converging in accordance with the prescription of reflective surface 160. Note that measurement light 184A is substantially centered on measurement arm axis 180 and comes to a focus at measurement spot 116.

Figure 6:
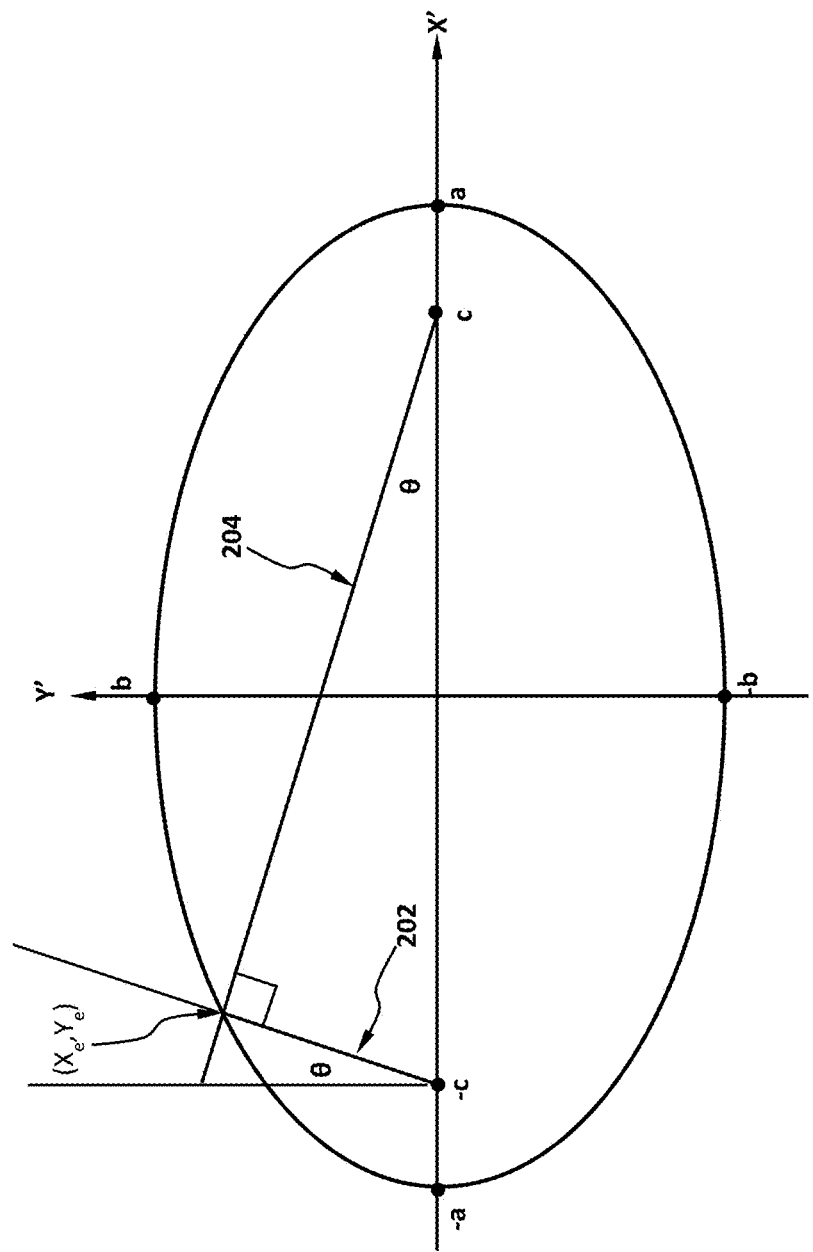
FIG. 6 is a diagram illustrating the geometry of the elliptical surface of the beamsplitter of the interferometer shown in FIG. 3.

The prescription of reflective surface 160 is critical to the performance of interferometer 150. Reflective surface 160 must form an image of the aperture 148 of input/output fiber 112 at measurement spot 116 which means reflective surface 160 has an elliptical prescription with the aperture 148 of fiber 112 at one focus of the ellipse and the measurement spot 116 at the second focus of the ellipse as shown in FIG. 6. As seen in FIG. 6, when designing the elliptical prescription of reflective surface 160, the foci of the ellipse are at +c and −c on the X-axis, the major vertices are at +a and −a on the X-axis, and the minor vertices are at +b and −b on the Y-axis. Also shown in FIG. 6 are the source arm 202 and measurement arm 204 light paths that are centered on the source/reference arm axis 178 and measurement arm axis 180 respectively of FIG. 3; note that source arm 202 and measurement arm 204 are perpendicular with one another and are at an angle θ with respect to the Y and X axes respectively. If elliptical reflective surface 160 has optical power, the magnification of the elliptical reflective surface is equal to the length of measurement arm 204 divided by the length of source arm 202. The magnification of elliptical reflective surface 160 determines the (geometrical)diameter of measurement spot 116 which is equal to the magnification×the diameter of the aperture 148 of input/output fiber 112, or more particularly:

$$\text{Spot Diameter} = \text{Fiber Diameter} \times \frac{\text{Measurement Arm Length}}{\text{Source Arm Length}} \quad \text{Equation 1}$$

For the present invention the value of the magnification, hereinafter referred to as "M", can be between 0.1 and 10.0, but for exemplary purposes will have a value of 2.0 (meaning the measurement arm 204 is twice as long as the source arm 202 and the diameter of measurement spot 116 is twice the diameter of the aperture 148 of input/output fiber 112). In the following calculations the length of the measurement arm 204 will be referred to as the Measurement Arm Length, or "MAL", and the length of the source arm 202 will be referred to as the Source Arm Length, or "SAL". The value of SAL can be between 5 mm and 500 mm but will have an illustrative value of 15 mm in the following example. The value of MAL can be between 5 mm and 1000 mm but will have an illustrative value of 30 mm in the following example. In the design of the elliptical reflective surface 160 of beamsplitter 156 a goal is to find values of a and b of the ellipse equation:

$$\frac{x^2}{a^2} + \frac{Y^2}{b^2} = 1 \quad \text{Equation 2}$$

Another property of an ellipse is that:

$$c^2 = a^2 - b^2 \quad \text{Equation 3}$$

Further, by inspection of FIG. 6 it can be seen that:

$$SAL^2 + MAL^2 = (2c)^2 \quad \text{Equation 4}$$

from which c can be determined as:

$$c = \frac{1}{2}\sqrt{SAL^2 + MAL^2} \quad \text{Equation 5}$$

c then has a value of 16.7705 mm in the ongoing illustrative example.

Next the values of $X_e$ and $Y_e$ can be derived from which the values of a and b can be found. Continuing with reference to FIG. 6, by inspection it can be seen that:

$$MAL = \sqrt{(c - X_e)^2 + Y_e^2} \quad \text{Equation 6}$$

Solving for $Y_e^2$ yields:

$$Y_e^2 = MAL^2 - (c - X_e)^2 \quad \text{Equation 7}$$

Also by inspection of FIG. 6 it can be seen that:

$$SAL = \sqrt{(c + X_e)^2 + Y_e^2} \quad \text{Equation 8}$$

Plugging Equation 7 into Equation 8 yields:

$$SAL = \sqrt{(c + X_e)^2 + MAL^2} - (c - X_e)^2 \quad \text{Equation 9}$$

Simplifying Equation 9 and solving for $X_e$ results in:

$$X_e = \frac{SAL^2 - MAL^2}{4c} \quad \text{Equation 10}$$

Substituting the exemplary values for SAL, MAL, and c into Equation 10 results in $X_e = -10.0623$ mm. Substituting the exemplary values for MAL, c, and $X_e$ into Equation 7 results in $Y_e = 13.4164$ mm. Note that the point $(X_e, Y_e) = (-10.0623, 13.4164)$ is on the ellipse (as shown in FIG. 6) and must also be a solution to Equation 2. Importantly, the point $(X_e, Y_e)$ corresponds to that location on the ellipse through which source/reference arm axis 178 and measurement arm axis 180 pass.

An interesting property of ellipses is that any path from −c to +c that passes through a point (X, Y) on the curve of the ellipse has the same length as any other such path. In the ongoing illustrative example any such path has a length of SAL+MAL=45.0 mm, including the path that pass through the point (+a, 0). This observation quickly leads us to Equation 11:

$$SAL + MAL = 2c + 2(a - c) \quad \text{Equation 11}$$

Solving for a yields:

$$a = \frac{SAL + MAL}{2} \quad \text{Equation 12}$$

Substituting illustrative values of SAL and MAL into Equation 12 yields an illustrative exemplary value of a=22.50 mm. Substituting illustrative values of a and c into Equation 3 yields an exemplary value of b=15.0 mm.

Finally, the value of θ must be determined. By inspection of FIG. 6 it can be seen that:

$$\tan\theta = \frac{Y_e}{2c - (c + X_e)} = \frac{Y_e}{c - X_e} \quad \text{Equation 13}$$

Substituting exemplary values for c, $X_e$, and $Y_e$ into Equation 13 results in θ=26.565°. At this juncture the ellipse underlying reflective surface 160 is fully specified.

Additional key features of beamsplitter 156 are PSD aperture 158 and reference aperture 162. Reference aperture 162 is a thru-hole that passes through the substrate of beamsplitter 156, through which reference light 182B is allowed to pass as the reference light 182B enters the reference arm of interferometer 150. Importantly, reflected reference light 190, also passes through reference aperture 162, but propagating in the opposite direction as reference light 182B, as it exits the reference arm and enters the input/output arm of interferometer 150. Reference aperture 162 can have a cylindrical profile or a conical profile, have an inner radius of between 0.10 mm and 10.0 mm, and can have an axis of rotation substantially co-axial with source/reference arm axis 178. Similarly, PSD aperture 158 is a thru-hole that passes through the substrate of beamsplitter 156, through which reflected PSD light 186B is allowed to pass as the reflected PSD light 182B enters the PSD arm of interferometer 150. PSD aperture 158 can have a cylindrical profile or a conical profile, have an inner radius of between 0.10 mm and 10.0 mm, and can have an axis of rotation substantially co-axial with measurement arm axis 180.

Figure 7:
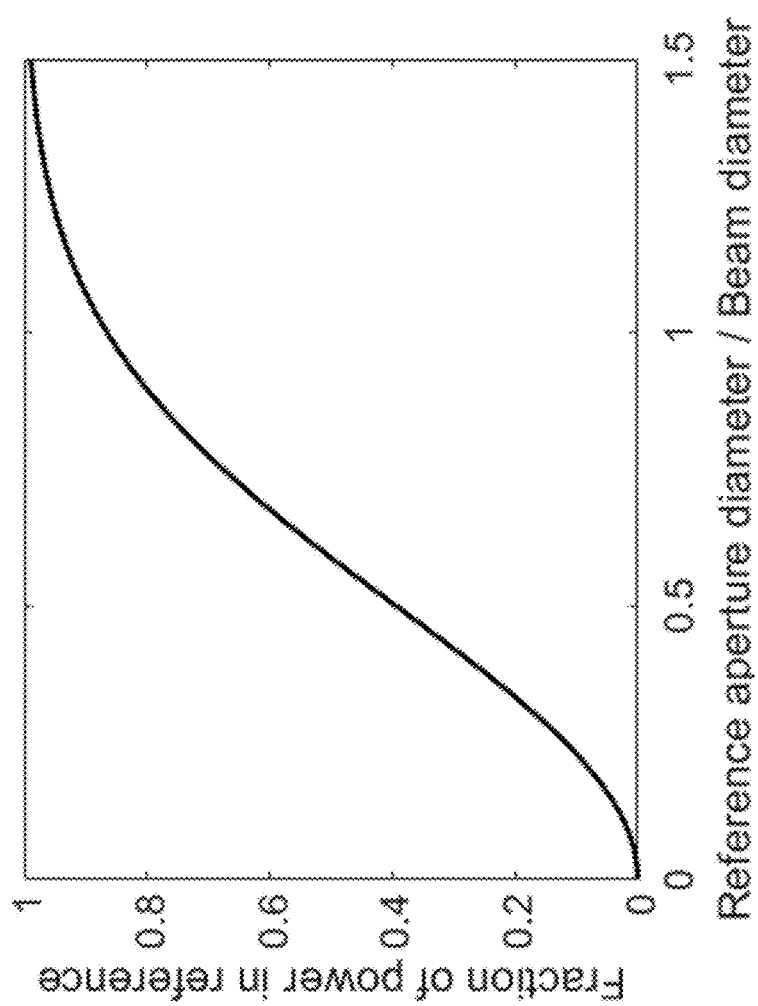
FIG. 7 is a graph of the fraction of power in the reference beam as a function of the ratio of the reference aperture diameter to the beam diameter at the beamsplitter.

Importantly, the ratio of the diameter of the reference aperture 162 to the diameter of the light cone 182 at beamsplitter 156 can be used to control the proportion of the light within light cone 182 that enters the reference arm and the proportion of the light within light cone 182 that enters the measurement arm. If the test surface 32 is a so-called uncooperative surface (i.e., it reflects a relatively small amount of light back to reflective surface 160, perhaps because test surface 32 is absorptive, tilted, or diffusely-reflective), then the diameter of the reference aperture 162 should small so the amount of light from aperture 148 of input/output fiber 112 within light cone 182 that enters the measurement arm is maximized. Conversely, if test surface 32 is highly-cooperative then the diameter of the reference aperture 162 should be larger so the amount of light within light cone 182 that enters the measurement arm is approximately the same as the amount of light that enters the reference arm through reference aperture 162. The ratioing effect is illustrated graphically in FIG. 7, in which the fraction of light from aperture 148 of input/output fiber 112 within light cone 182 that enters the reference arm (shown on the vertical axis) as a function of the ratio of the diameter of the reference aperture 162 to the $1/e^2$ diameter of light cone 182 at reflective surface 160 (shown on the horizontal axis). The fraction of light of light cone 182 that enters the reference arm through reference aperture 162 can be between 0.01 and 0.90.

Referring back to FIG. 2, interferometer system 100 can also include a spectrograph 120. Spectrograph 120 is an optical instrument that is used to spectrally disperse an optical signal into a spectrum of wavelengths, such that the constituent wavelengths, which are generally unknown but are desired to be known, within the optical signal can be analyzed. Spectra produced by spectrograph 120 is coupled to an input of camera 122 that captures imagery of the spectra produced by the spectrograph 120. That is, the output of the spectrograph 120 is an optical signal being presented as intensity as a function of wavelength, and an image of this optical signal is subsequently presented to camera 122 which captures the image, converts the image to an electronic format, and transmits the electronically formatted spectral image to the digital processing system 124 for processing. The spectrograph 120 nominally has the same spectral bandwidth as the free spectral range, or chromatic range, of the interferometer 150, such as the 400 nm to 800 nm spectral range cited earlier. The spectral resolution of spectrograph 120 in this example is fine enough that the individual interference fringes within the interferogram can be resolved. Therefore, the resolution of the spectrograph 120 can be better than 100 pm (100 picometers), or in some examples preferably less than 50 pm, or in other examples better than 20 pm. One such spectrograph that meets these requirements is the Hornet Hyperfine Spectrometer from LightMachinery Inc., Ottawa, Ontario, Canada.

The camera 122 captures an image of the optical signal or spectrum created by the spectrograph 120 and converts the image to an electronic format. In one example, the camera 122 is a line camera, wherein the image sensor of the camera 122 comprises a row of pixels arranged linearly, and onto which a spectral image is projected by spectrograph 120. In such a case, there can be between 256 and 16,384 pixels in the image sensor whose length can be up to 100 mm, and the imaging frame rate can be up to 200,000 captured images per second. More preferably, spectrograph 120 and camera 122 may be operative with two-dimensional spectral images. In this two-dimensional example, the camera 122 can have an image sensor whose pixels are arranged in a two-dimensional array wherein the pixel count can be from 640×480 pixels up to 10,000×5000 pixels, the size of the image sensor can be from 3.2 mm×2.4 mm up to 50 mm×25 mm, and the frame rate can be between 10 images/second up to 50,000 images/second. The camera 122 in this example is a monochrome camera (as opposed to color) and has a gray-scale bit depth of from 8 bits up to 20 bits, although other types of cameras may be used. The output of camera 122 is coupled to an input of a digital processing system 124.

The digital processing system 124 may include one or more processors, a memory, and/or a communication interface, which are coupled together by a bus or other communication link, although the digital processor system 124 can include other types and/or numbers of elements in other configurations and also other types of processing systems may be used. The processor(s) of digital processor system 124 may execute programmed instructions stored in memory for any number of the functions described and illustrated herein. The processor(s) of digital processor system 124 may include one or more CPUs or general-purpose processors with one or more processing cores, for example, although other types of processor(s) can also be used although the digital processor system 124 may comprise other types and/or numbers of components and/or other elements in other configurations.

The memory of the digital processor system 124 stores these programmed instructions for one or more aspects of the present technology as described and illustrated herein, such as for generating spectral content values of light output by interferometer 150 and for determining displacement or some other property of test surface 32 or a test object as described and illustrated herein for execution by the processing unit by way of example, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

The communication interface of the digital processor system 124 operatively couples and communicates to the spectrograph 120 and to the camera 122 by a communication system, although other types and/or numbers of communication systems with other types and/or numbers of connections and/or configurations to other devices and/or elements can also be used.

By way of example only, the digital processing system 124 also could be a conventional microprocessor with an external memory or the digital processing system 124 can be a microcontroller with all memory located onboard. In another example, the digital processing system 124 could be a digital signal processor (DSP) integrated circuit, which is a microcomputer that has been optimized for digital signal processing applications, including centroid computations, regression, and curve-fitting. In yet another example, the digital processing system 124 could be a graphical processing unit (GPU) integrated circuit, which is a microcomputer that has been optimized for parallel-processing applications.

The digital processing system 124 could be as simple as a sixteen-bit integer device for low-cost applications or the digital processing system 124 can be a thirty-two bit or sixty-four bit or higher floating-point device or system for higher performance when cost is not an issue. Also, by way of example only, the digital processing system 124 could be an FPGA (Field-programmable gate array) or a CPLD (complex programmable logic device) which are attractive for use in examples of this technology owing to their compact and cost-effective hardware implementations.

Examples of one or more portions of the claimed technology as illustrated and described by way of the examples herein may also be embodied as one or more non-transitory computer readable media having instructions stored thereon for one or more aspects of the present technology, such as the memory of the digital processor system 124. The instructions in some examples include executable code that, when executed by one or more processors, such as the processor(s) of the digital processor system 124, cause the one or more processors to carry out steps necessary to implement the methods of the examples of this technology that are described and illustrated herein.

The interferometer system output 126 is an electronic signal line that couples an output of digital processing system 124 to an input of a downstream electronic device such as a client computer or a display (not shown). As such interferometer system output 126 is typically a serial bus such as USB or SPI bus, for inter-computer communications, or HDMI in the case where the downstream electronic device is a display. The data communicated through interferometer system output 126 bus can be the displacement measured by interferometer system 100, as well as other data, such as meta-data (such as, for example, the date and time of the measurement, the speed of the measurement, details about the object having test surface 32 being measured, etc.) about the displacement measurement process.

An example of a method for measuring displacement with the interferometer system 100 will now be described with reference to FIG. 2 and FIG. 3. Referring to FIG. 2, a light source comprising the laser driver 102 and the fiber laser 104 outputs broadband light from the fiber laser 104 which then enters the filter assembly 106. In this example, the filter assembly 106 removes unwanted wavelengths from the broadband light, such as those from 800 nm to 2400 nm, although the filter assembly could provide other types of filtering. The filter assembly 106 also can remove unwanted polarizations from the source light, such that the light, for example, which exits filter assembly 106 is linearly polarized by way of example. The filtered light that exits the filter assembly 106 is transmitted through source fiber 108 to an input port of the fiber coupler 110. A large portion of the filtered light that enters coupler 110 is substantially transmitted through coupler 110 and passes through input/output fiber 112 whereupon the filtered light enters the input/output arm of interferometer 150 through aperture 148.

Referring now to FIG. 3, filtered light that exits input/output fiber 112 diverges as it exits input/output fiber 112, said divergence due primarily to the light being diffracted as it exits from the 5 µm diameter aperture 148 of single mode input/output fiber 112, and having an envelope within light cone 182. The outer portion of diverging source light within light cone 182, namely measurement light 182A, is incident on reflective surface 160 which reflects the light and also, having an elliptical prescription, causes the reflected light to come to a focus at a location, such as measurement spot 116, on a test surface 32 whose displacement is to be measured. Light that is specularly reflected from test surface 32 is reflected back to reflective surface 160 and, the outer portion (i.e., that which is not incident on PSD aperture 158) is reflected once again by reflective surface 160 and comes to a focus on the aperture 148 of input/output fiber 112. In such an arrangement, the measurement spot 116 and the entrance/exit aperture 148 of input/output fiber 112 are optical conjugates with one another and are said to be in a confocal configuration. This light from the measurement spot 116 that is incident upon the aperture 148 of input/output fiber 112 then enters input/output fiber 112, is transmitted to fiber coupler 110 and a portion of which is routed into output fiber 118 whereupon it is transmitted to, and enters, spectrograph 120 as seen in FIG. 2.

Continuing with reference to FIG. 3, the inner portion of diverging source light within light cone 182, namely reference light 182B, is not incident on reflective surface 160 but instead enters reference aperture 162. Still diverging, reference light 182B then passes through reference aperture 162, reflects from reflective surface 166 of fold mirror 164, and is incident on reference mirror surface 170. Reference mirror surface 170 has a spherical prescription such that diverging reference light 188 that is incident upon it is reflected as reflected reference light 190 in such a manner that (converging) reflected reference light 190 substantially overlaps diverging reference light 188. Reflected reference light 190 therefore is incident on, and reflects from, reflective surface 166, enters and passes through reference aperture 162, then propagates as output reference light 192 to the aperture 148 on input/output fiber 112, then enters input/output fiber 112, is transmitted to fiber coupler 110 and a portion of which is routed into output fiber 118 whereupon it is transmitted to, and enters, spectrograph 120 as seen in FIG. 2.

Note that substantially all of the wavelengths of light present in the light output by the filter assembly 106 are also present in the light entering input/output fiber 112 from the reference arm of interferometer 150. Further, this broadband output reference light that enters input/output fiber 112 propagates through input/output fiber 112, fiber coupler 110, and output fiber 118 to spectrograph 120. Similarly, all of the wavelengths of light present in the light output by the filter assembly 106 are also present in the light entering input/output fiber 112 from the measurement arm (i.e., from the measurement spot 116 on test surface 32) of interferometer 150. Further, this broadband output measurement light that enters input/output fiber 112 propagates through input/output fiber 112 to spectrograph 120.

The spectrograph 120 spectrally disperses the wavelengths of the broadband reference light and projects the spectrum onto the image sensor of the camera 122. This reference light is then available to produce interference fringes on the image sensor of the camera 122 with any light from the measurement arm that is concurrently projected onto the image sensor. The spectrograph 120 also spectrally disperses the received measurement light and projects the spectrum onto the image sensor of the camera 122. This dispersed measurement light interferes and produces interference fringes on the image sensor of the camera 122 with the dispersed light from the reference arm that is concurrently projected onto the image sensor.

Figure 8:
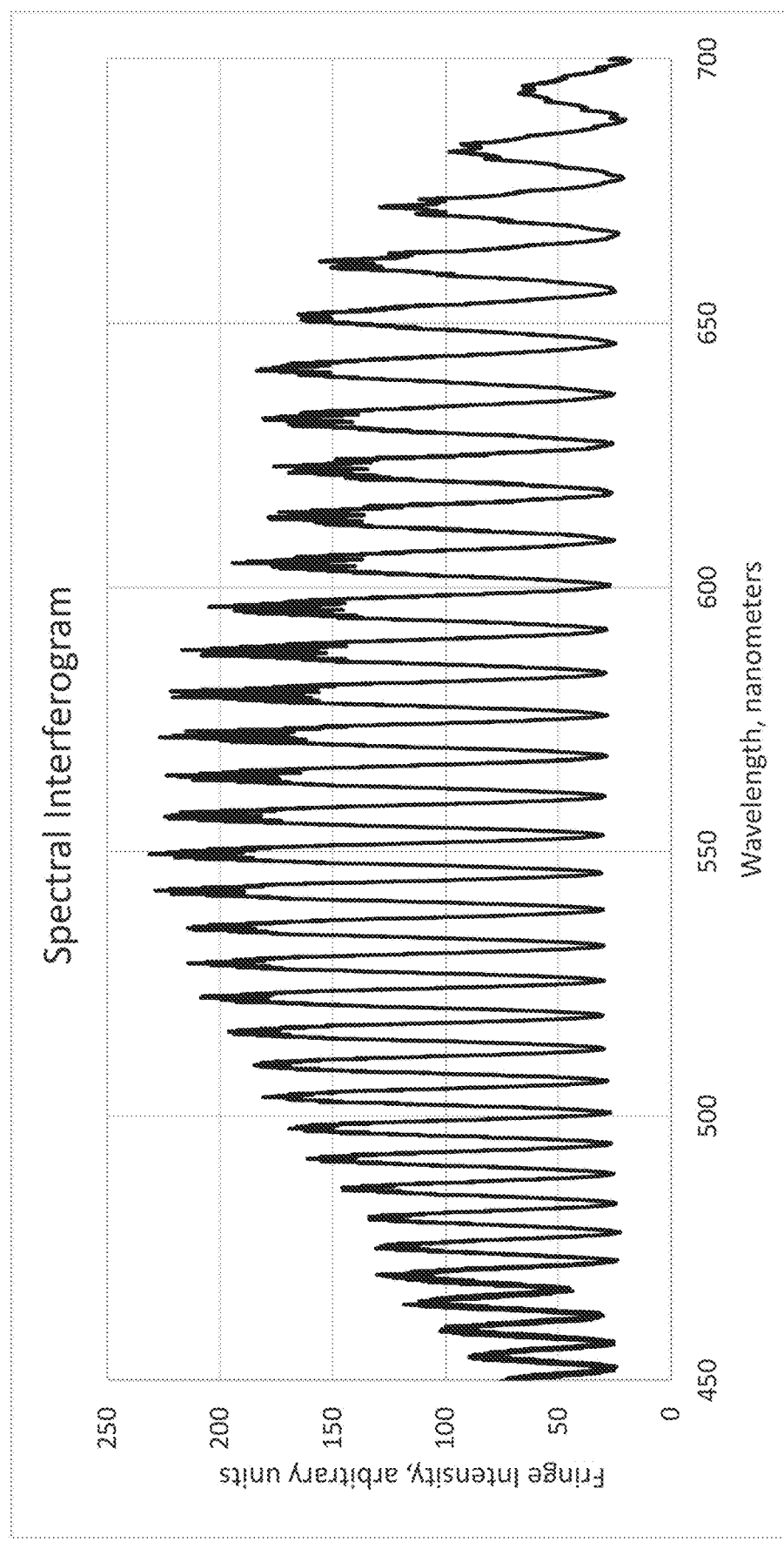
FIG. 8 is an example of a spectral interferogram output by the spectrograph in accordance with embodiments of the present invention.

In this example, another requirement to produce high contrast interference fringes is that the two interfering beams are coherent with one another, which means that the optical path difference (OPD) between the lengths of the propagation paths of the two interfering beams (namely the measurement arm path and the reference arm path) is less than the coherence length of the light being interfered. Indeed, it is the OPD information that contains information about the displacement, offset 198, or change in offset 198 between interferometer 150 and test surface 32 at measurement spot 116. The OPD is equal to the difference of the optical path length between the reference arm and the measurement arm, i.e., $OPD=OPL_{ref}-OPL_{meas}$ (or equivalently, $OPD=OPL_{meas}-OPL_{ref}$). The optical path length of the reference arm, $OPL_{ref}$, is equal to twice the geometrical distance from the aperture 148 of input/output fiber 112 to reference mirror surface 170 along the source/reference arm axis 178 and reference arm axis 176, and is substantially constant. The optical path length of the measurement arm, $OPL_{meas}$, is equal to twice the geometrical distance from the aperture 148 of input/output fiber 112 to test surface 32 along the source/reference arm axis 178 and measurement arm axis 180, and is not substantially constant but varies in accordance with the elevation of test surface 32 at measurement arm axis 180 as interferometer 150 is scanned over test surface 32. Indeed, it is the changing value of the quantity $OPL_{meas}$ which is to be determined, which can be found from the interference equation:

$$I_t = I_{meas} + I_{ref} + 2\sqrt{I_{meas}I_{ref}}\cos\left[\frac{2\pi(OPL_{ref}-OPL_{meas})}{\lambda}\right] \quad \text{Equation 14}$$

where $I_t$ is the total interference value, $I_{meas}$ is the intensity of the light from the measurement arm, $I_{ref}$ is the intensity of the light from the reference arm, and $\lambda$ is the wavelength of the light being interfered. FIG. 8 is an example of a spectral interferogram captured in accordance with embodiments of the present invention as disclosed herein. Note the frequency of the fringes within the interferogram of FIG. 8 changes in accordance with wavelength in accordance with Equation 14 in which the wavelength, $\lambda$, is present in the denominator of the cosine term. Further, the OPD, which is equal to $OPL_{ref}-OPL_{meas}$, is held constant during the short measurement period in which the interferogram of FIG. 8 was captured, and it is this term (in the numerator of the cosine term of Equation 14) which determines the frequency of the fringes at particular values of wavelength, $\lambda$.

It is the spectral interference pattern described by Equation 14 that is captured by camera 122. Further, the spectral interference pattern captured by camera 122 is digitized by camera 122 and the digital representation of the spectral interference pattern is output to digital processor 124. Software executing within digital processor 124 then mathematically analyzes the captured and digitized spectral interference pattern and determines a value for OPD from which a value of $OPL_{meas}$ can be determined. Note that for interference fringes to form the absolute value of OPD must be greater than 0.0. Further, the absolute value of the OPD must be less than the coherence length of fiber laser 104, said coherence length can be less than or equal to 5.0 mm, or, in some cases, up to 10 mm or even 100 mm.

The ability of interferometer system 100 to measure $OPL_{meas}$, changes in $OPL_{meas}$, and the topography of test surface 32 can be very good. For example, if the spectral bandwidth is 200 nm wide (i.e., if $\lambda$ of Equation 12 spans 200 nm), and spectrograph 120 has a resolution of 0.005 nanometers, then some 200/0.005=40,000 sample points will be available across the digitized spectral interference pattern, and the software executing within digital processor 124 can then repeatably determine $OPL_{meas}$ to better than 1 nm (one standard deviation), or, when the SNR (Signal to Noise Ratio) of the captured spectral interference pattern exceeds 50:1 the $OPL_{meas}$ determination can be better than 0.10 nm (one standard deviation).

In the absence of systematic errors the repeatability of a determined value of $OPL_{meas}$ (especially when the test surface is tilted between measurements) can be used as a proxy for the accuracy of interferometer system 100. However, one source of systematic error is caused by reflective surface 160. If reflective surface 160 is perfect and has no surface figure errors (e.g., if reflective surface is a perfect ellipse and is perfectly aligned with respect to source/reference arm axis 178), then reflective surface 160 will not impart any systematic errors to the displacement measurement process. However, because reflective surface 160 cannot be manufactured perfectly, nor can it be installed and aligned perfectly in interferometer 150, then reflective surface 160 can introduce systematic errors into the displacement-measurement process. One way reflective surface 160 can cause systematic errors is that, given a constant offset 198, a different tilt of test surface 32 will cause the reflected measurement light 186A to be incident on a different portion of reflective surface 160, and because of imperfections in the topography or surface figure of reflective surface 160 will cause spurious changes in the value of $OPL_{meas}$. That is, different values of test surface 32 tilt can cause erroneous changes in $OPL_{meas}$ even when the offset 198 or displacement is constant.

One way to correct this problem is by calibrating or characterizing the spurious erroneous changes in $OPL_{meas}$ with changes in the tilt of test surface 32 at measurement spot 116. The calibration can be accomplished by keeping the offset 198 or displacement constant, intentionally tilting test surface 32 (e.g., by carefully rotating test surface 32 about measurement spot 116), and noting the value, or change in value, of $OPL_{meas}$ with the amount and direction of the tilt of test surface 32. Then during the process of measuring the topography of test surface 32, any errors in $OPL_{meas}$ caused by tilts of test surface 32 can be known and subtracted from the determined value of $OPL_{meas}$. This calibration and characterization process requires information about the amount and direction of the tilt of test surface 32; said information can be provided by PSD 172. For example, with reference to FIG. 3, the direction of reflected PSD light 186B is determined by the amount and direction of tilt of test surface 32 at measurement spot 116, and the location where reflected PSD light 186B is incident on PSD 172 in turn is also directly dependent on the amount and direction of tilt of test surface 32.

During the calibration and characterization process, positional data of reflected PSD light 186B on PSD 172 is output by PSD 72 through PSD output line 130 to DAQ 128 which then digitizes the data output by PSD 72 and transmits the digitized PSD 72 output data to digital processor 124. Digital processor 124 can then associate data from PSD 72 with a measured erroneous change in $OPL_{meas}$. Importantly, during the calibration process, test surface 32 is intentionally rotated through the entire operational surface-tilt envelope of interferometer, said envelope can be up to +1.0° of rotation about the X and Y axes, or in this example preferably up to +2.0° of rotation about the X and Y axes, or ideally more than +5.0° of rotation about the X and Y axes, while maintaining a constant displacement of test surface 32 at measurement spot 116 (or, more particularly, where measurement arm axis 180 intersects test surface 32). For every value of intentionally-induced tilt of test surface 32 both the values of the output of PSD 172 and $OPL_{meas}$ are determined and stored in memory of digital processor 124. Then, when measuring and determining the topography of an unknown test surface 32, which will generally have unknown and/or unanticipated surface tilts, for a new surface displacement measurement the value of the output of PSD 172 can be determined, its associated $OPL_{meas}$ error can be recalled from memory of digital processor 124, and the associated $OPL_{meas}$ error can be subtracted from the value of $OPL_{meas}$ determined during the measurement process thereby removing systemic errors caused by imperfections in the optics of interferometer 150 (especially reflective surface 160). As an aside, these systemic errors caused by imperfections in the interferometer's optics and a tilted surface are akin to so-called retrace errors commonly found, and generally not corrected, in areal type interferometers. The calibration process described above for removing test surface 32 tilt induced errors from the process of measuring the topography of test surface 32 is a key benefit of the present invention.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. An interferometer system comprising
a fiber optic;
a reference arm; and
a beamsplitter comprising:
    an elliptical mirror positioned to focus light from the fiber optic onto a test surface and to focus light reflected from the test surface onto the fiber optic; and
    an aperture through which light from the fiber optic enters the reference arm.

2. The system as set forth in claim 1 further comprising a base on which the beamsplitter is mounted.

3. The system as set forth in claim 2 wherein the base and the beamsplitter are both composed of a material with a coefficient of thermal expansion less than 10 parts per billion (PPB) per degree C.

4. The system as set forth in claim 2 wherein the base and the beamsplitter are both composed of a material with a coefficient of thermal expansion less than 5 parts per billion (PPB) per degree C.

5. The system as set forth in claim 3 wherein the base and the beamsplitter are bonded with a mixture comprising at least sodium hydroxide or sodium silicate.

6. The system as set forth in claim 1 wherein the reference arm further comprises a reference mirror.

7. The system as set forth in claim 6 wherein the reference mirror has a spherical shape.

8. The system as set forth in claim 1 wherein the reference arm has an associated path length and a measurement arm has an associated path length and the absolute value of the difference between the optical path lengths is greater than 0.0.

9. The system as set forth in claim 1 further comprising a broadband light source positioned to focus light on the fiber optic.

10. The system as set forth in claim 9 wherein the reference arm has an associated path length and a measurement arm has an associated path length and the absolute value of the difference between the optical path lengths is less than the coherence length of the broadband light source.

11. The system as set forth in claim 1 wherein a diameter of an aperture of the fiber optic is less than 6 um.

12. The system as set forth in claim 1 further comprises a position sensing device configured to sense a tilt of the test surface.

13. The system as set forth in claim 12 wherein the beamsplitter further comprises a second aperture through which a portion of the light reflected from the test surface is transmitted.

14. The system as set forth in claim 12 further comprising a digital processor configured to determine a systemic error of the interferometer system based on the sensed tilt of the test surface.

15. The system as set forth in claim 14 wherein the digital processor is further configured to subtract the determined systemic error from a measurement of the interferometer system to improve accuracy.

16. A method for making an interferometer system comprising
providing a fiber optic;
providing a reference arm; and
providing a beamsplitter comprising:
positioning an elliptical mirror to focus light from the fiber optic onto a test surface and to focus light reflected from the test surface onto the fiber optic; and
providing an aperture through which light from the fiber optic enters the reference arm.

17. The method as set forth in claim 16 further comprising mounting the beamsplitter on a base.

18. The method as set forth in claim 17 wherein the base and the beamsplitter are both composed of a material with a coefficient of thermal expansion less than 10 parts per billion (PPB) per degree C.

19. The method as set forth in claim 17 wherein the base and the beamsplitter are both composed of a material with a coefficient of thermal expansion less than 5 parts per billion (PPB) per degree C.

20. The method as set forth in claim 17 wherein the base and the beamsplitter are bonded with a mixture comprising at least sodium hydroxide or sodium silicate.

21. The method as set forth in claim 16 wherein the providing the reference arm further comprises providing a reference mirror.

22. The method as set forth in claim 21 wherein the reference mirror has a spherical shape.

23. The method as set forth in claim 1 wherein the reference arm has an associated path length and a measurement arm has an associated path length and the absolute value of the difference between the optical path lengths is greater than 0.0.

24. The method as set forth in claim 16 further comprising positioning a broadband light source to focus light on the fiber optic.

25. The method as set forth in claim 24 wherein the reference arm has an associated path length and a measurement arm has an associated path length and the absolute value of the difference between the optical path lengths is less than the coherence length of the broadband light source.

26. The method as set forth in claim 16 wherein the providing the fiber optic further comprises providing the fiber optic with a diameter of an aperture of the fiber optic less than 6 um.

27. The method as set forth in claim 16 further comprises providing a position sensing device configured to sense a tilt of the test surface.

28. The method as set forth in claim 27 wherein the providing the beamsplitter further comprises providing the beamsplitter with a second aperture through which a portion of the light reflected from the test surface is transmitted.

29. The method as set forth in claim 27 further comprising providing a digital processor configured to determine a systemic error of the interferometer system based on the sensed tilt of the test surface.

30. The method as set forth in claim 29 wherein the providing the digital processor further comprises providing the digital processor configured to subtract the determined systemic error from a measurement of the interferometer system to improve accuracy.

* * * * *